United States Patent
Cai et al.

(10) Patent No.: US 7,311,667 B2
(45) Date of Patent: Dec. 25, 2007

(54) MULTIPLE PATTERN TRANSDUCER ARRAY AND METHOD OF USE

(75) Inventors: Anming He Cai, San Jose, CA (US); Lewis J. Thomas, Palo Alto, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 435 days.

(21) Appl. No.: 10/238,523

(22) Filed: Sep. 9, 2002

(65) Prior Publication Data

US 2004/0049110 A1    Mar. 11, 2004

(51) Int. Cl.
*A61B 8/00*    (2006.01)
(52) U.S. Cl. .................................... 600/459
(58) Field of Classification Search ............... 600/437, 600/443, 447, 459, 463, 466–467; 310/334, 310/336, 365–368
See application file for complete search history.

(56) References Cited

U.S. PATENT DOCUMENTS

| | | | | |
|---|---|---|---|---|
| 4,412,316 A | * | 10/1983 | Diepers ..................... | 367/105 |
| 5,097,709 A | * | 3/1992 | Masuzawa et al. ........... | 73/626 |
| 5,167,231 A | * | 12/1992 | Matsui ....................... | 600/459 |
| 5,367,496 A | * | 11/1994 | Sullivan et al. .............. | 367/7 |
| 5,671,746 A | * | 9/1997 | Dreschel et al. ............ | 600/472 |
| 5,902,241 A | * | 5/1999 | Seyed-Bolorforosh et al. ........................... | 600/443 |
| 5,920,972 A | | 7/1999 | Palczewska et al. | |
| 5,977,691 A | | 11/1999 | Stephens et al. | |
| 6,126,602 A | | 10/2000 | Savord et al. | |
| 6,279,399 B1 | * | 8/2001 | Holm ......................... | 73/626 |
| 6,352,510 B1 | * | 3/2002 | Barabash et al. ........... | 600/443 |
| 6,419,633 B1 | * | 7/2002 | Robinson et al. ........... | 600/443 |
| 6,524,254 B2 | * | 2/2003 | Erikson ..................... | 600/447 |
| 6,641,534 B2 | * | 11/2003 | Smith et al. ................. | 600/437 |

FOREIGN PATENT DOCUMENTS

| | | |
|---|---|---|
| DE | 36 50 004 T2 | 5/1986 |
| DE | 37 33 776 A1 | 4/1988 |
| EP | 0 697 257 A2 | 2/1996 |

* cited by examiner

*Primary Examiner*—Francis J Jaworski

(57) ABSTRACT

Transducer with different array configurations and methods of using the transducers are provided. An electrode layer on one side of a transducer device defines a one-dimensional array of elements. An electrode layer on an opposite side of the transducer device defines a multi-dimensional array. For example, one transducer device may be used for both two-dimensional imaging and three-dimensional imaging in response to the one-dimensional array and multi-dimensional array electrode configurations. Real time three-dimensional imaging and two-dimensional imaging may be provided with a single transducer. As another example, elements defined by one electrode configuration have a different surface area than elements defined by another electrode configuration. The different configurations on opposite sides of the transducer devices may be a same type (e.g. both one-dimensional arrays) or different types.

19 Claims, 2 Drawing Sheets

MULTIPLE PATTERN TRANSDUCER ARRAY AND METHOD OF USE

BACKGROUND

The present invention relates to transducers for ultrasound imaging. In particular, versatile transducer array configurations are provided.

For ultrasonically scanning a two-dimensional plane within a patient, a one-dimensional array of transducer elements is used. For a one-dimensional array, a plurality of elements are spaced along an azimuth direction. The elements are defined by electrodes. For example, an upper grounding plane electrode covers the entire array, and electrodes spaced along the azimuth at the bottom of transducer material define the specific elements. Each element is spaced from another element by approximately one-half the wavelength of use for scanning at angles from the transducer array. For linear scanning or other scanning, different spacings between the centers of elements, such as a full wavelength spacing, may be used. Other transducers provide multi-dimensional arrays of elements. For example, a 1.5 dimensional or two-dimensional array of elements are provided. Like a one-dimensional array, electrodes on a bottom side of the transducer material define the specific elements with grounding plane on a top side of the transducer material.

Orthogonal arrays may be provided with a single transducer. For example, on a top side of the transducer material, a one-dimensional array of elements defined by electrodes spaced along a first dimension is provided. On an opposite side of the transducer material, a one-dimensional array of electrodes is spaced along an orthogonal direction. The transducer is operable to scan two different, orthogonal two-dimensional planes. One layer of electrodes is grounded while the other layer of electrodes is used for generating acoustic energy as a first one-dimensional array. The electrodes active for the first one-dimensional array are grounded while the previously grounded electrodes are connected to system channels for scanning with a second, orthogonal one-dimensional array.

BRIEF SUMMARY

The present invention is defined by the following claims, and nothing in this section should be taken as a limitation on those claims. By way of introduction, the preferred embodiments described below include transducers with different array configurations and methods for using the transducers. An electrode layer on one side of a transducer device defines a one-dimensional array of elements. An electrode layer on an opposite side of the transducer device defines a multi-dimensional array. For example, one transducer device may be used for both two-dimensional imaging and three-dimensional imaging in response to the one-dimensional array and multi-dimensional array electrode configurations. Real time three-dimensional imaging and two-dimensional imaging may be provided with a single transducer. As another example, elements defined by one electrode configuration have a different surface area than elements defined by another electrode configuration. The different configurations on opposite sides of the transducer devices may be a same type (e.g. both one-dimensional arrays) or different types. In general, the purpose of having separately defined one and two dimensional arrays is to trade off resolution in the 2D array for the ability to focus and steer in elevation.

Further aspects and advantages of the invention are discussed below in conjunction with the preferred embodiments.

BRIEF DESCRIPTION OF SEVERAL VIEWS OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

A transducer array with different element configurations provides imaging with different characteristics. For example, a transducer array of one-dimensional elements is defined by an electrode layer on one side of transducer device. An electrode layer on an opposite side of the transducer device defines a different configuration, such as a two-dimensional or multi-dimensional array of elements. In alternative embodiments, an electrode layer on one side defines an array along a same or different number of dimensional arrays as the opposite side, but with different spacing or element area shape.

Figure 1:
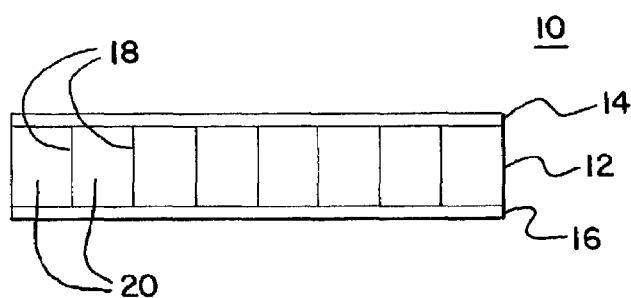
FIG. 1 is a side view of one embodiment of a transducer.

FIG. 1 shows one embodiment of a transducer 10. The transducer 10 includes a transducer device 12 and two electrode layers 14 and 16. Additional or different components may be provided, such as including matching layers, backing layers, lens material or other ultrasound transducer materials or components.

The transducer device 12 comprises a ceramic material, a piezoelectric material, a flexible membrane, an electrostatic device, a capacitive membrane ultrasound transducer (CMUT), or other now known or later developed device for transducing between acoustic and electrical energy. Where the transducer device 12 is a piezoelectric or ceramic material, a plurality of kerfs 18 or dicing channels separate the transducer device into a plurality of sub-elements 20. In alternative embodiments, the transducer device 12 comprises a composite of epoxy or other material and piezoelectric. Kerfs 18 may be provided, but the epoxy may be used for separating the acoustically active ceramic material. For a membrane or CMUT transducer device, kerfs 18 may or may not be provided for acoustic isolation of sub-elements 20. For example, any given element includes a plurality of membranes not shared between elements such that the substrate supporting the membranes provides acoustic isolation between sub-elements 20.

The electrode layers 14 and 16 comprise deposited conductors, such as deposited metal layers. Glued or bonded conductive material may also be used. In one embodiment, one or both of the electrode layers 14 and 16 comprise flexible circuit material with conductive strips or coatings. In alternative embodiments, the electrode layers 14 and 16 comprise wires or other conductive materials now known or later developed for use with the transducer device 12.

One electrode layer 14 is on an opposite side of the transducer device 12 than the other electrode layer 16. For example, the electrode layer 14 comprises a top electrode layer placed adjacent to the skin of a patient and through which acoustic energy is transmitted to and from the patient. The other electrode layer 16 is a bottom electrode layer, such as adjacent a backing material for limiting further transmission of acoustic energy. In a membrane or a CMUT transducer 10, the electrode layers 14 and 16 are on opposite sides of a membrane gap or a gap between a substrate and the flexible membrane. For example, one or both of the electrode layers 14 and 16 are within or between the membrane and the substrate. As used herein, electrodes on opposite sides of a transducer device include electrodes within the gap between the substrate and the membrane, one or more electrodes on an upper surface of a membrane, or an electrode on a bottom of the substrate. For ceramic or piezoelectric material, one or more of the electrode layers 14, 16 may be partially within the ceramic material. A voltage difference between the electrode layers 14 and 16 causes compression or expansion of the transducer device, such as compression or expansion of a ceramic or movement of the membrane towards or away from a substrate.

Figure 2:
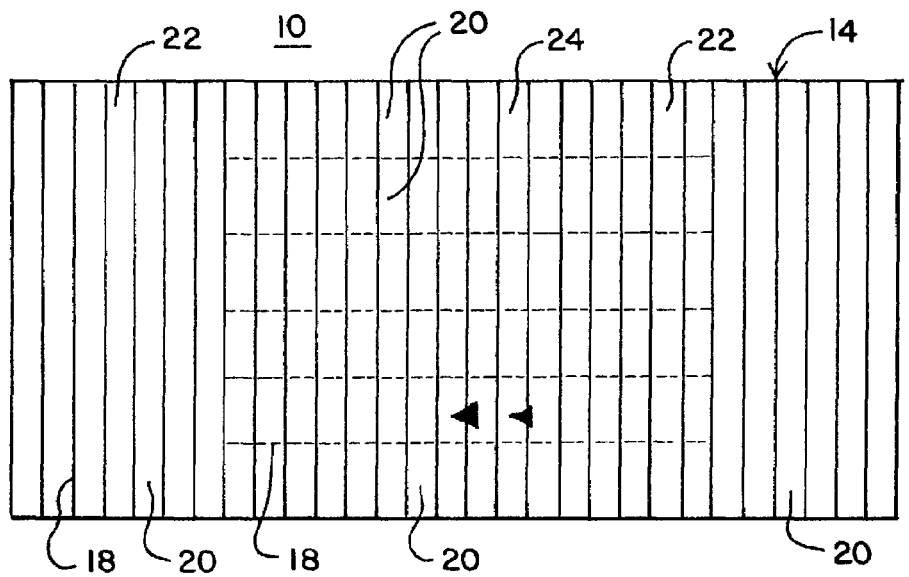
FIGS. 2 and 3 are top and bottom views, respectively, of the embodiment of the transducer of FIG. 1.

The electrode layers 14, 16 are patterned to define arrays of different configurations. The patterning is provided by dicing, deposition, masking or other now known or later developed process for defining an array of electrodes. The different patterns of the two electrode layers 14, 16 are associated with arrays of the same dimensional extent, such as different one dimensional arrays, or arrays of different dimensional extents, such as a one-dimensional array and a multi-dimensional array. FIG. 2 shows a top view of the transducer 10 and associated pattern (solid lines) of the first electrode layer 14. The patterning of the electrode layer 14 provides a one-dimensional array of elements 22. Each of the elements 22 is associated with one or more sub-elements 20 of the transducer device 12. For example, the elements 22 at either end of the one-dimensional array include a single sub element 20. Each electrode and associated element 22 is separated by kerfs 18. In this example, each of the elements 22 in a center portion of the one-dimensional array include a plurality of sub-elements 20 spaced along the elevation dimension. For example, the centered element 24 includes six sub-elements 20 along an elevation dimension. Additional, different or fewer sub-element compared to electrode arrangements may be provided, such as providing a plurality of sub-elements for each element or for different elements 22 of the one dimensional array. While twenty-nine elements 22 are shown for the electrode layer 14, more or fewer elements may be provided.

In one embodiment, each of the elements 22 is associated with approximate half wavelength separation between the centers of each element. The wavelength is a function of the intended frequency of use and bandwidth of the transducer 10. The one dimensional array of elements 22 defines a scan plane along the azimuthal dimension for scanning along scan lines normal to or at angles to the array. In alternative embodiments, a wavelength or other spacing between elements 22 is provided for scanning with scan lines at a normal angle to the transducer 10.

Figure 3:
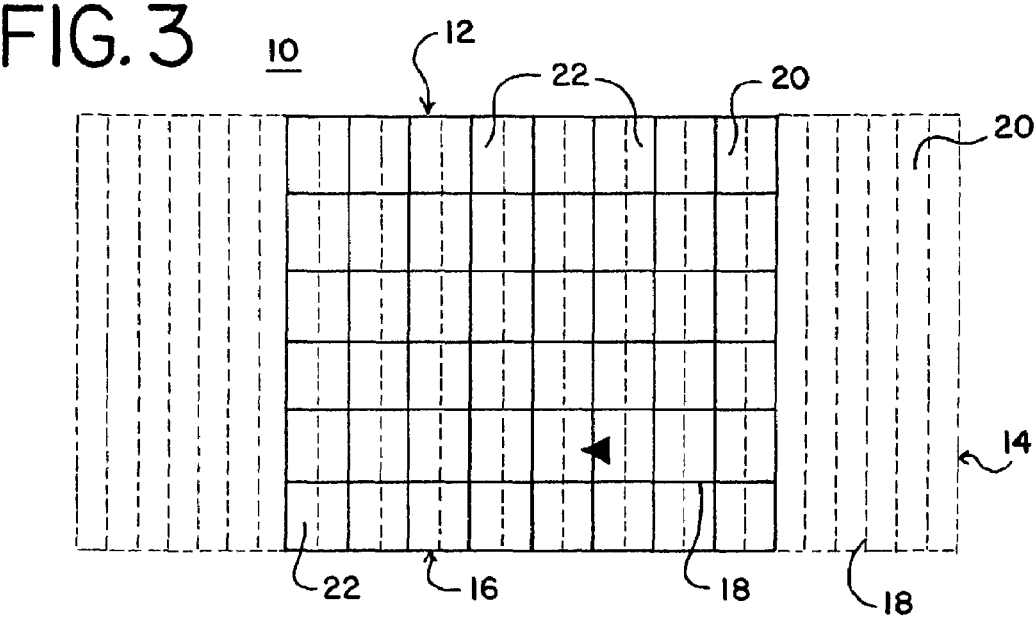

FIG. 3 shows a bottom view of the transducer 10 and the electrode layer 16. The electrode layer 16 is patterned (solid lines) to provide a two-dimensional configuration or array of elements 22. Other multidimensional arrays of elements may be provided, such as 1.25, 1.5, 1.75 or any of various combinations of N by M elements where both N and M are greater than 1. Arrays may be used where one or both of N and M are 1. In alternative embodiments, a multidimensional electrode pattern includes any pattern of electrodes with more than one element along two different dimensions for at least a part of the extent of the array. Any now known or later developed multidimensional array configurations and associated electrode patterns may be used.

Each of the elements 22 includes two sub-elements 20 of the transducer device 12. Kerfs 18 define the pattern and separate the sub-elements 20. In alternative embodiments, different elements 22 include different numbers of sub-elements 20 than other elements 22. The one-dimensional array pattern is shown as dashed line and extends beyond the aperture defined by the pattern of the electrode layer 16. In alternative embodiments, the electrode layer 16 includes the entire transducer device 12 or the same extent as the electrode layer 12. In yet other alternative embodiments, the electrode layer 16 extends beyond the extent of the electrode layer 12.

Since elements from multidimensional arrays tend to have smaller surface areas than for one-dimensional arrays, a higher voltage may be used to drive the element due to the higher impedance. In one embodiment, the electrode layer 16 configured as a multidimensional array is positioned on a bottom of the transducer device 12 away from the patient. Where positioned on the bottom, the transducer device 16 acts as an electrical isolator between the patient and the electrode layer 16. In alternative embodiments, a multidimensional transducer array electrode layer 16 is positioned on the top of the transducer device 12.

The electrode layer pattern of one side may have a different size of electrodes than another side. For example, a surface area of the electrodes 22 of the first layer 14 is different than the surface area of electrodes 22 of the opposite electrode layer 16. In the embodiments of FIGS. 2 and 3, the surface area of the electrode 22 of the one-dimensional array of the first layer 14 are three times the surface area of the electrode 22 of the multi-dimensional array of opposite electrode layer 16. Other relative surface areas may be provided.

As another example difference, the electrodes 22 of different layers 14, 16 have a same or different surface area with a difference in elevational extent or length of each element 22. For example, the elements 22 of the one-dimensional array of the first layer electrodes 14 of FIG. 2 provide a greater elevational length than elements of a one-dimensional or multidimensional array defined by the other electrode layer 16. The electrode layer 16 may provide a one-dimensional array along the same azimuthal dimension and the elements 22 of the one-dimensional array of layer 14 but extending for only one-half or other fraction of the elevation distance. Two or three elevationally spaced rows of shorter elevational length elements may be provided as a 1.25, 1.5 or 1.75 dimensional array using the electrode layer 16. As another alternative example, an orthogonal one-dimensional array is defined by the pattern of the electrode layer 16 with a non-square transducer device 12 or the elevation extent of the array extends along the azimuthal direction of the one-dimensional array of the electrode layer 12. Extending across the entire face of the transducer device 12, the elevation extent of the element 22 of the top layer 14 is less than the elevation extent of the one-dimensional array provided by the bottom electrode layer 16. Various combinations of multi-dimensional, one-dimensional elements with different length may be provided.

The azimuth dimension of the electrodes and associated elements 22 is the same or different for the different electrode layers 14, 16. For example and as shown in FIGS. 2 and 3, the elements 22 of the one-dimensional array electrode layer 14 are one-half the length, center-to-center spacing or sampling than the spacing of the electrodes 22 of the multi-dimensional array electrode layer 16. Since the number of elements 22 may be limited by the number of transmit or receive beamformer channels or number of cables, elements with a greater size or more spacing may be used for multidimensional imaging to reduce the required number of channels. Multi-dimensional imaging may use limited beam steering to avoid grating lobes. For higher resolution two-dimensional imaging, the one-dimensional array defined by the electrode layer 14 uses one-half wavelength spacing of the elements 22. Half or other wavelength spacing may be used for either one or multi-dimensional arrays. As another example of different azimuth length, a multi-dimensional or one-dimensional array defined by a first layer 14 operates at a different center frequency than the one-dimensional or multi-dimensional array of elements 22 defined by the other electrode layer 16. Elements 22 of both layers 14, 16 are associated with one-half or one wavelength sampling, but are intended for use with different frequencies.

The electrodes 22 of the pattern of one electrode layer 14 have a same or different shape than the electrodes 22 of the other electrode layer 16. For example, FIG. 2 shows elements and associated electrodes 22 with a rectangular shape, and FIG. 3 shows the elements and associated electrodes 22 with a substantially square shape. Other examples include electrodes 22 of each electrode layer 14, 16 with different ones of rectangular, square, triangular, hexagonal or different combinations thereof. For example, a multi-dimensional array of square or rectangular elements and electrodes 22 is provided in a first layer 14, and a multi-dimensional array of triangular or hexagonal elements and associated electrodes 22 are provided in the other layer 16. As yet another example, elements and associated electrodes 22 associated with a two-dimensional array are substantially square on one electrode layer 14, and a 1.5 dimensional configuration of substantially rectangular elements and associated electrodes 22 is defined by another electrodes layer 16. The shape, size, surface area and other characteristics of the electrode 22 and associated elements or combination of sub-elements 20 is optimized for desired imaging, such as two-dimensional or three-dimensional imaging with normal or non-normal scan lines at any one of various frequencies and associated bandwidths.

The separation between the electrodes 22 of each layer 14 and 16 is associated with a kerf 18 in the transducer device 12 or other acoustic isolation, such as space between membranes on a substrate for a CMUT. The kerfs for other acoustic isolation are formed at a same time using the same process as for forming the electrodes 22 or are formed at different times using the same or different processes. By aligning the acoustic isolation within the transducer device 12 and the electrical separation of the electrodes 22, acoustically and electrically isolated elements are provided for each of the electrode patterns. Acoustic isolations for one electrode pattern may result in a plurality of the sub-elements 20 being attached to a same electrode 22 of the other electrode pattern.

In one embodiment, a lens is positioned adjacent to the top electrode layer 14, such as being positioned adjacent a matching layer bonded to the electrode layer 14. The lens provides a mechanical focus in one or more dimensions. For example, the lens provides an elevation focus associated with the one-dimensional array defined by the electrode layer 14 shown in FIG. 2. For imaging with the different array defined by the other electrode layer 16 shown in FIG. 3, the delays applied by the beamformer channels are adjusted to account for the mechanical focus. For example, the delays applied by the transmit or receive beamformers account for mechanical focus. In alternative embodiments, the lens is concave or convex, providing a mechanical focus in a plurality of dimensions. The beamformer delays account for the mechanical focus in any of the various dimensions as a function of the configuration or pattern of the electrodes 22 being used for transmitting and receiving.

Figure 4:
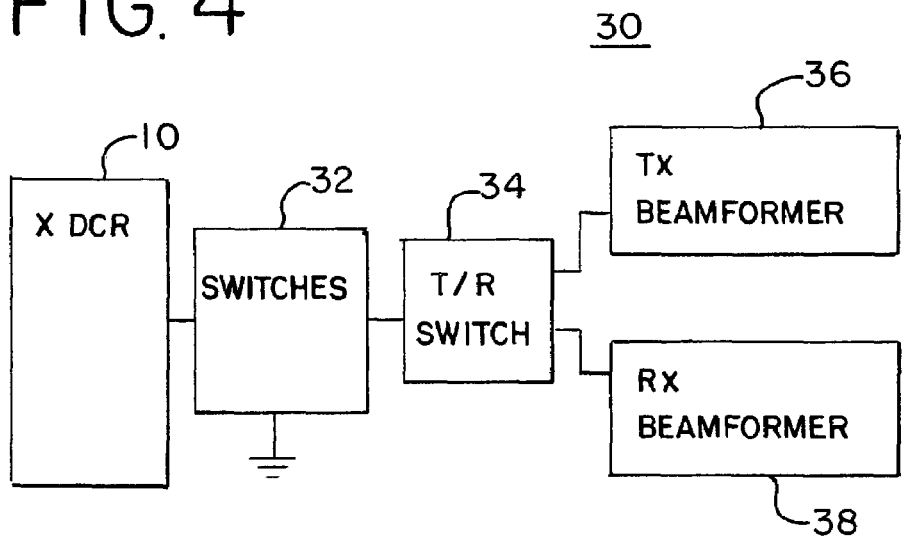
FIG. 4 is a block diagram of one embodiment of a system using any of various embodiments of the transducers.

The transducers 10 of any of the various embodiments discussed herein are used within ultrasound system 30 as shown in FIG. 4. The transducers 10 may be used with different ultrasound systems. The ultrasound system 30 includes the transducer 10, one or more switches 32, and optional transmit and receive switch 32, a transmit beamformer 36 and a receive beamformer 38. Additional, different or fewer components may be provided.

The switches 32 comprise analog or digital, single or multiple pole switches. In one embodiment, the switches 32 comprise a network of switches, such as a multiplexer. The switches 32 are connectable to the electrodes 22 of the electrode layers 14, 16. The switches 32 are operable to ground the electrodes 22 of one layer 14, 16 and connect the electrodes 22 of the other layer 16, 14 to system channels, such as transmit and receive beamformer channels or cables. The switches 32 allow one layer 14, 16 to be selectively connected to the system channels while the other layer 16, 14 is grounded. The switches 32 may also allow selection of a sub-aperture of fewer than all of the electrodes 22 of one layer to connect with the system channels. For example, a greater number of electrodes 22 on one layer 14, 16 are provided than available cables or system channels. A subset of the elements is selected for connection with the cables and system channels. For a two-dimensional array, a sparse array or other aperture configuration may be used. In alternative embodiments, all of the elements of one layer 14, 16 are connected with corresponding separate system channels.

In one embodiment, limited beamforming components, such as analog delays and summers are provided within a probe housing with the transducer 10. The beamformer components act to partially beamform signals from a sub-group of elements and associated electrodes 22. As a result, fewer cables and associated system channels than elements and associated electrodes 22 of one layer 14, 16 may be used. Such structures are disclosed in U.S. Pat. No. 6,126,602, the disclosure of which is incorporated herein by reference. By providing analog beamforming within the probe housing of the transducer 10, a greater number of array elements and associated electrodes 22 for a multi-dimensional array may be provided with a limited number of system channels and cables. In another approach, time division multiplexing allows the use of a larger number of elements than cables.

The transmit receive switch 34 comprises an analog or digital switch for selecting between connection of the transducer 10 with the transmit beamformer 36 or with the receive beamformer 38. Transmit receive switch 34 comprise a plurality of switches, such as one switch for each channel or associated element and electrode 22 in a selected aperture. The transmit and receive switch is optional. For example, a transmit beamformer 36 connects to different elements 22 than the receive beamformer 38, or the receive beamformer and transmit beamformer 36 and 38 are combined as one device.

The transmit beamformer 36 comprises one or more transistors, waveform generators, memories, digital-to-analog converters, or other analog or digital devices now known or later developed for generating a unipolar, bipolar or more complex transmit waveform. The transmit beamformer 36 may also include a plurality of delays, amplifiers and other components for processing one waveform relative to another waveform to transmit along acoustic scan lines at different positions and with the same or different focal depths. In one embodiment, the transmit beamformer 36 is operable to drive the connected element to ground. For example, the switches 32 connect the transmit beamformer 36 to the elements 22 of one layer 14, 16 while the receive beamformer 38 is connected through the switches 32 to the other layer 16, 14. The transmit beamformer 36 then drives the connected electrode 22 to a ground potential. For example, the transmit beamformer 36 includes one or more transistors connecting the transmit beamformer channels to ground. In yet other alternative embodiments, the transmit beamformer 36 is allowed to float. The switches 32 connect the electrodes 22 to ground and isolate the transmit beamformer 36 from the receive beamformer 38. In yet other alternative embodiments, the transmit and receive switches 34 isolate the transmit beamformer 36 from the receive beamformer 38. The switches 32 may be provided in the probe housing a transducer 10 or with the ultrasound system housing the transmit beamformer 36 and receive beamformer 38.

The receive beamformer 38 comprises a plurality of analog or digital delays, amplifiers and other components for focusing and steering dynamically with a plurality of receive beamformer channels. The receive beamformer 38 also includes a summer, such as an analog summing point or a digital adder for combining delayed and apodized signals from the plurality of receive channels. The receive beamformer 38 outputs radiofrequency, in-phase and quadrature or other information for ultrasound processing, detection and imaging.

Figure 5:
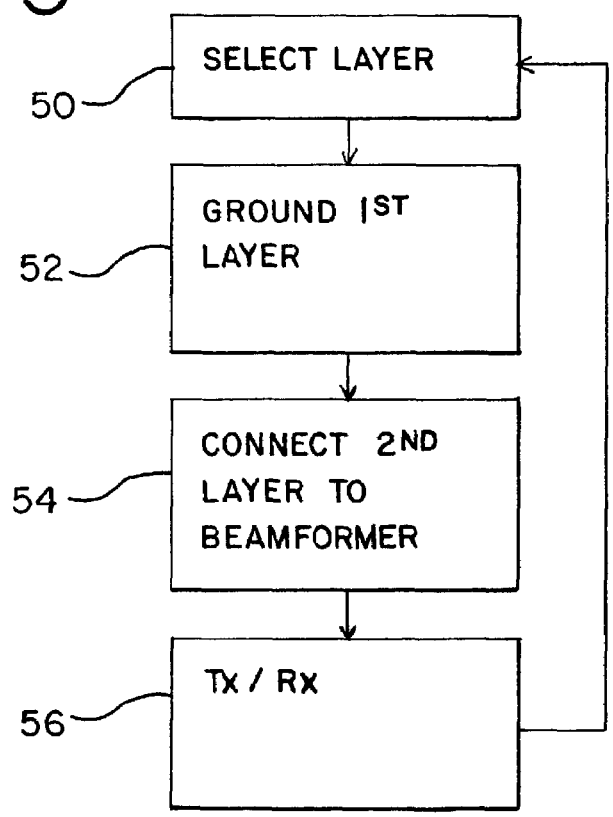
FIG. 5 is a flow chart diagram of one embodiment of a method of use of a transducer with multiple configurations.

FIG. 5 shows a flow chart of one embodiment for using the transducer 10 with different array configurations. In act 50, the array configuration is selected. The electrode layer 14, 16 and associated electrodes 22 to be used for imaging are selected. A combination of non-overlapping elements and associated electrodes 22 from different layers 14, 16 may be selected, but preferably electrodes 22 from one electrode layer 14, 16 are selected to be used for acoustic scanning. The frequency of operation of the transmit beamformer 36, receive beamformer 38 and other system parameters are configured based on the selection of the layer 14, 16.

In act 52, the non-selected electrodes 22, the electrodes 22 of the electrode layer 16, 14 opposite the electrodes 22 selected for imaging, or a subset of electrodes 22 are grounded. The switches 32 connect these electrodes 22 or the electrode layer 14, 16 to ground. Alternatively, the transmit beamformer 36 drives the electrodes 22 to the ground potential. In alternative embodiments, a non-ground or non-zero DC voltage is connected to the non-selected elements 22.

The selected elements 22 or electrode layer 16, 14 is connected to a beamformer in act 54. For example, the electrodes 22 of one electrode layer 16, 14 are connected to a transmit beamformer 36, receive beamformer 38, or combinations thereof through switches 32 and the transmit and receive switch 34. The connection with the system channels allows use of the selected electrodes 22 and associated elements for scanning the patient.

In act 56, the selected electrodes in conjunction with the grounded electrodes 22 of the transducer device 12 are used for scanning a patient in transmit operations, receive operations, or combinations thereof. For example, transmit waveforms are provided to the selected electrodes 22. In response to the potential difference between the electrodes 22 receiving the transmit waveforms and the grounded electrodes 22, the transducer device 12 generates acoustic energy transmitted into the patient. For receiving information, the transducer device 12 generates an electrical potential difference between the selected electrodes 22 and the grounded electrodes 22. The difference in potential is provided to the receive beamformer 38. In one embodiment, the same selected electrodes 22 are used for both transmit and receive operations. In alternative embodiments, different electrodes 22 on a same or different electrode layers 14, 16 are used for transmit than are used for receive operations.

The selected electrodes 22 may be used for scanning within a two-dimensional plane or three-dimensional volume. In alternative embodiments, different electrodes 22 are selected for different scan lines or to provide for different apertures as a function of scan line, focal depths, desired beam characteristics or another variable.

In one embodiment, the selected electrodes 22 and corresponding electrode layer 14, 16 are used for one type of scanning, such as two-dimensional imaging using a one-dimensional array. A different electrode layer 14, 16 and associated electrodes 22 are selected and used in act 52, 54 and 56 for a different type of scanning, such as scanning with a multi-dimensional array in a two-dimensional or a three-dimensional volume.

While the invention has been described above by reference to various embodiments, it should be understood that many changes and modifications can be made without departing from the scope of the invention. For example, different one-dimensional arrays may be provided on opposite sides of the transducer device 12 using the different electrode layers 14, 16. As yet another example, different multi-dimensional arrays with patterns different in at least one of the characteristics discussed above may be used for the different electrode layers 14, 16.

It is therefore intended that the foregoing detailed description be understood as an illustration of the presently preferred embodiment of the invention, and not as a definition of the invention. It is only the following claims, including all equivalents, that are intended to define the scope of this invention.

What is claimed is:

1. An ultrasound transducer for different element patterns, the transducer comprising:
   a transducer device;
   a first electrode layer on a first aide of the transducer device, a first pattern of the first electrode layer defining a one-dimensional array, the first pattern fixed by being formed as part of the first electrode layer; and
   a second electrode layer on a second side of the transducer device, the second side opposite the first side, a second pattern of the second electrode layer defining a multi-dimensional array, the second pattern fixed by being formed as part of the second electrode layer.

2. The transducer of claim 1 wherein the first pattern defines a first plurality of elements and the second pattern defines a different, second plurality of elements, each of the first plurality of elements having a different surface area than each of the second plurality of elements.

3. The transducer of claim 1 wherein the second pattern defines a two-dimensional array.

4. The transducer of claim 1 wherein the second pattern defines a 1.25, 1.5 or 1.75 dimensional array.

5. The transducer of claim 1 wherein an elevation length of elements of the first pattern is different than an elevation length of the elements of the second pattern.

6. The transducer of claim 1 wherein the first pattern corresponds to a one half wavelength spacing between elements and the second pattern corresponds to a one wavelength spacing between elements.

7. The transducer of claim 1 further comprising a plurality of switches connectable with the first and second electrode layers, the plurality of switches operable to ground one of the first and second electrode layers and operable to connect the other of the first and second electrode layers to beamformer channels.

8. The transducer of claim 7 wherein the plurality of switches are operable to connect a sub-set of elements of the other of the first and second electrode layers to the beamformer channels.

9. The transducer of claim 1 wherein the second electrode layer comprises a plurality of electrodes, further comprising at least one summer connected with a sub-set of the plurality of electrodes, the at least one summer in a probe housing with the transducer device.

10. An ultrasound transducer for different element patterns, the transducer comprising:
    a transducer device;
    a first electrode layer on a first side of the transducer device, a first dedicated pattern of the first electrode layer defining first elements, each with a first surface area; and
    a second electrode layer on a second side of the transducer device, the second side opposite the first side, a second dedicated pattern of the second electrode layer defining second elements each with a different surface area than the first elements;
    wherein at least the first or second pattern comprises a multi-dimensional array.

11. The transducer of claim 10 wherein the first pattern comprises a one-dimensional array and the second pattern comprises a multi-dimensional array.

12. The transducer of claim 10 wherein the first pattern comprises a first multi-dimensional array and the second pattern comprises a second multi-dimensional array.

13. The transducer of claim 10 wherein an elevation length of elements of the first pattern is different than an elevation length of the elements of the second pattern.

14. The transducer of claim 10 wherein the first pattern corresponds to a one half wavelength spacing between elements and the second pattern corresponds to a one wavelength spacing between elements.

15. The transducer of claim 10 further comprising a plurality of switches connectable with the first and second electrode layers, the plurality of switches operable to ground one of the first and second electrode layers and operable to connect the other of the first and second electrode layers to beamformer channels.

16. A method for using a transducer array with different electrode configurations, the method comprising:
    (a) selectively connecting one of first and second electrodes on first and second, opposite sides, respectively, of a transducer device with ground, the first electrodes patterned as a one dimensional array and the second electrodes patterned as a multi-dimensional array, the first and second electrodes formed in fixed patterns; and
    (b) selectively connecting the other of the first and second electrodes with beamformer channels.

17. The method of claim 16 wherein (a) comprises grounding the first electrodes of the one-dimensional array and (b) comprises connecting the second electrodes of the multi-dimensional array to the beamformer channels.

18. The method of claim 16 wherein (a) comprises grounding the second electrodes of the multi-dimensional array and (b) comprises connecting the first electrodes of the one-dimensional array to the beamformer channels.

19. An ultrasound transducer for different element patterns, the transducer comprising;
    a transducer device;
    a first electrode layer on a first side of the transducer device, a first dedicated pattern of the first electrode layer defining a first multi-dimensional array; and
    a second electrode layer on a second side of the transducer device, the second side opposite the first side, a second dedicated pattern of the second electrode layer defining a second multi-dimensional array, the first multi-dimensional array having a different configuration of electrodes than the second multi-dimensional array.

* * * * *